United States Patent [19]
Young et al.

[11] 3,956,923
[45] May 18, 1976

[54] METHOD OF DETECTING SMALL GAS LEAKS IN FILLED AEROSOL CONTAINERS

[75] Inventors: Gerald Alfred Young, Cincinnati; Hugh Ansley Thompson, Fairfield; Charles Wilbur Chappell, West Chester, all of Ohio

[73] Assignee: The Procter & Gamble Company, Cincinnati, Ohio

[22] Filed: Jan. 17, 1975

[21] Appl. No.: 541,855

[52] U.S. Cl. .................................. 73/49.3; 73/40.7
[51] Int. Cl.² .......................................... G01M 3/32
[58] Field of Search ...................... 73/49.3, 40.7, 52

[56] References Cited
UNITED STATES PATENTS

| | | | |
|---|---|---|---|
| 3,824,839 | 7/1974 | Briggs | 73/40.7 |
| 3,888,111 | 6/1975 | Craig | 73/49.3 |

*Primary Examiner*—Donald O. Woodiel
*Attorney, Agent, or Firm*—Melville, Strasser, Foster & Hoffman

[57] ABSTRACT

A process and apparatus for detecting small gas leaks in filled, pressurized containers. Each container to be tested, or that portion of each container to be tested, is enclosed and sealed in a test chamber. The space within the test chamber is evacuated to remove any residual gas or liquid within the chamber or on the surfaces of the container. Thereafter, the evacuated chamber is sealed and held for a predetermined period of time to permit any gas leaking from the container to accumulate and diffuse throughout the chamber. A quantity of carrier gas is then introduced into the test chamber and held therein for a predetermined period of time so that the carrier gas and leakage gas may comingle and equilibrate. This provides an equilibrated, fixed volume of carrier gas-leakage gas mixture, the leakage gas content of which is dependent only upon the leak rate of the container. The equilibrated mixture is then transferred to a sensor. The signal produced by the sensor for each container tested is compared to the sensor's response to a predetermined leak standard of acceptable value. A method is also provided to compensate for contamination of the carrier gas and for drift of the sensor.

22 Claims, 4 Drawing Figures

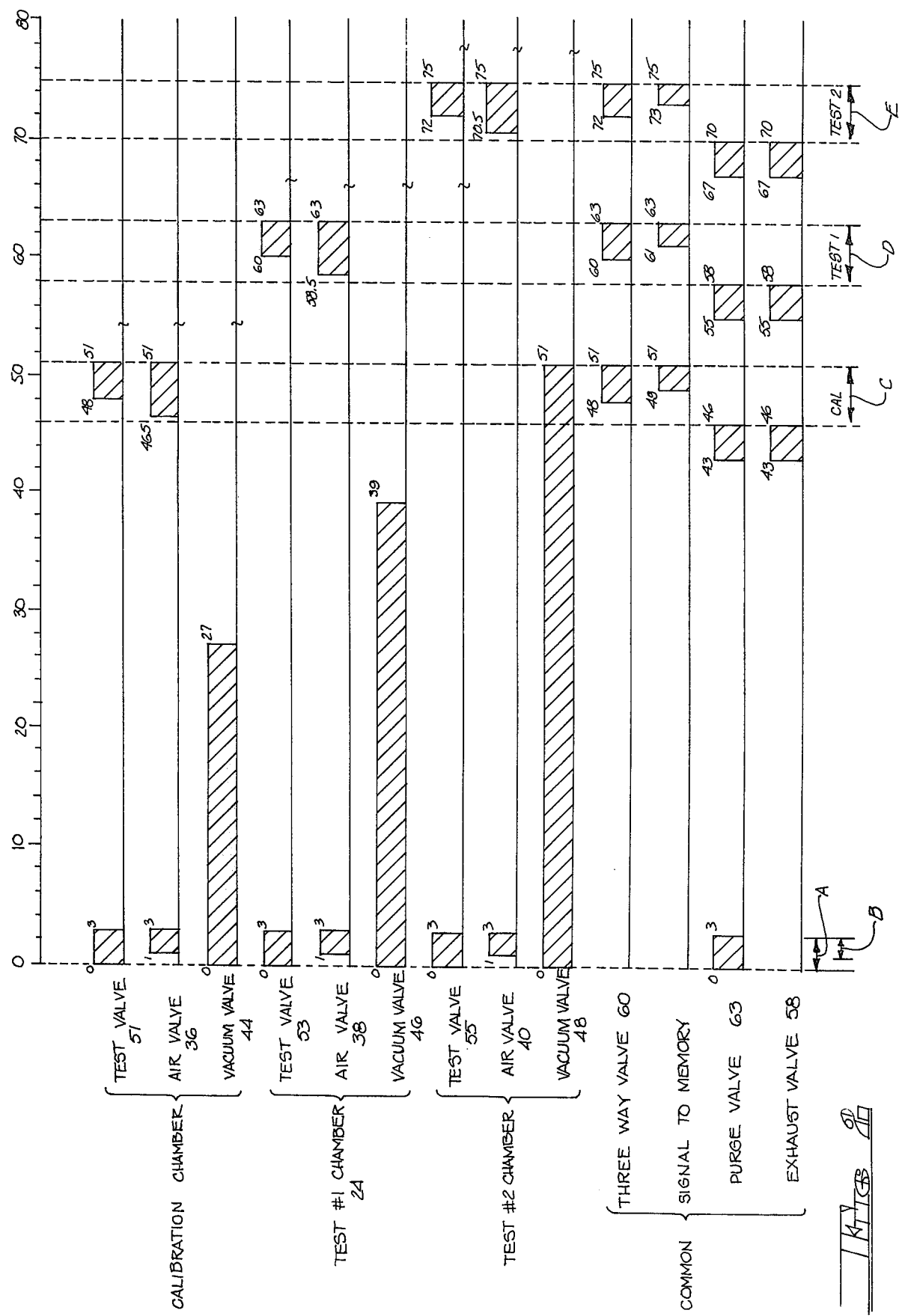

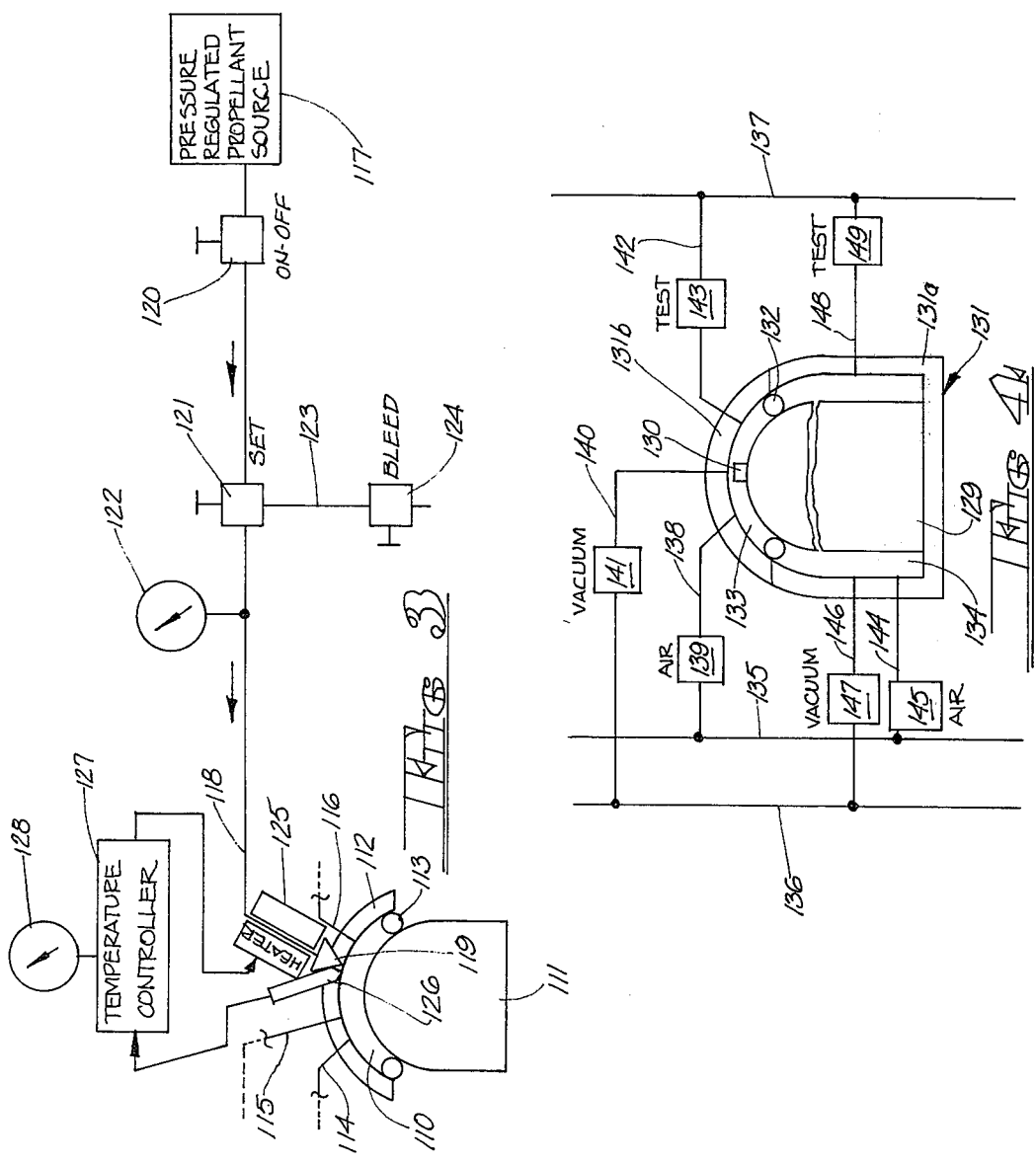

METHOD OF DETECTING SMALL GAS LEAKS IN FILLED AEROSOL CONTAINERS

BACKGROUND OF THE INVENTION

1. Field of the Invention

The present invention relates to a method of detecting gas leaks in pressurized containers, and more particularly to the detection of small gas leaks in an ambient atmosphere which may contain significant quantities of the same gas being detected.

2. Description of the Prior Art

The method of the present invention may be used to detect small gas leaks in any type of container. While not intended to be so limited, for purposes of an exemplary showing, the method will be described in its application to the detection of small propellant leaks in aerosol containers. The method is adaptable to a continuous in-line testing system in an aerosol container filling line or the like. However, again for purposes of an exemplary showing, the method will be described in terms of a batch-testing system.

All aerosol containers leak to some extent. Gross leakage is readily determinable by a number of well known expedients. The present invention, however is directed to the detection of small leaks. The term "small leaks" herein and in the claims is intended to relate to such leakage rates as would adversely affect a two-year shelf life of the aerosol container. What would constitute such a small leakage rate would depend upon the size of the container and other factors. However, the present invention contemplates detection of leaks which result in a loss of about 10% by weight of propellant per year or less. In the practice of the present invention the lower limit of the size of the leak capable of being detected depends upon the sensitivity of the particular sensing device used. Detection of such leaks is not only difficult by virtue of the fact that the leaks are so small, but also because the detecting frequently has to be done in an ambient atmosphere which contains significant quantities of leaked or spilled propellant as would be found near an aerosol container filling line.

Prior art workers have devised numerous methods and devices for detecting leaks. For example, U.S. Pat. No. 3,302,449, issued Feb. 7, 1967 to J. A. Roberts, teaches a portable leak detector comprising a chamber protected from the ambient air by a curtain of purified air. U.S. Pat. No. 3,729,983, issued May 1, 1973 to M. J. M. Coppens, describes a mass testing apparatus and process providing a plurality of test chambers for the containers to be tested. Each test chamber is evacuated, sealed under low pressure and held to accumulate any leakage from the container therewithin. The accumulated leakage is flushed to an infrared spectra analysis-type detector by a suitable inert gas. U.S. Pat. No. 3,762,212, issued Oct. 2, 1973 to J. D. Morley and P. Forgash, teaches a mass spectrometer leak testing apparatus wherein the container to be tested is placed in a chamber. The chamber is evacuated and the collected leakage is, by vacuum, conveyed to the mass spectrometer. U.S. Pat. No. 3,675,469, issued July 11, 1972 to C. H. Macartney and J. A. Bawduniak, sets forth a direct method for sensing a leak from various parts of an aerosol container. U.S. Pat. No. 3,186,214, issued June 1, 1965 to J. A. Roberts, describes a testing system having a testing chamber into which a leak standard is introduced for calibration purposes. Other leak testing devices and methods are exemplified by U.S. Pat. No. 2,051,758, issued Aug. 18, 1936 to A. A. Trombly; 2,091,323, issued Aug. 31, 1937 to P. Kruse and 2,387,743, issued Oct. 30, 1945 to A. M. Cameron and V. Lelinski.

The present invention is directed to an improved method of detecting small leaks in pressurized containers. The method lends itself well to both continuous and batch-type testing systems. Furthermore, it may be utilized to detect leaks from various parts of pressurized containers as will be described hereinafter.

The test method of the present invention is rapid and accurate in operation; provides means generating a gas leak standard against which each container tested is compared; and provides means for compensating for contamination of the carrier gas and means for compensating for drift of the detector or sensing device.

SUMMARY OF THE INVENTION

The method of the present invention, described in terms of the testing for small leaks in aerosol containers, contemplates the use of a calibration chamber and a plurality of test chambers. A leak of known and predetermined rate, constituting the maximum acceptable leak rate, is introduced into the calibration chamber. The aerosol containers to be tested, or those parts of the containers to be tested, are sealed in the test chambers. Means are provided for sequentially sweeping a gas leak standard from the calibration chamber and then samples from the test chambers through a detector or sensing device. Means are also provided for comparing the sensor's response to the leak rate standard and its response to each of the samples from the test chambers and to indicate those aerosol containers which have a leak rate greater than the leak rate standard.

During the testing operation, the space within each test chamber container an aerosol container to be tested is evacuated to remove any residual gas within the chamber or any residual gas or liquid spilled onto the surfaces of the container during the filling operation. Thereafter, the evacuated chamber is sealed and held for a predetermined period of time to enable any gas leaking from the container to accumulate and diffuse throughout the evacuated chamber. A quantity of carrier gas is then introduced into the test chamber and held therein for a predetermined period of time to enable the carrier gas and the leakage gas to co-mingle and equilibrate. Through the introduction of additional carrier gas into the test chamber, the equilibrated mixture is forwarded by displacement to the sensor. The calibration chamber, provided with a leak of a predetermined rate, is treated in the same manner.

When not supplied with a sample from the calibration chamber or one of the test chambers, the sensor is continuously supplied with the carrier gas. Any sensor signal developed by the carrier gas is subtracted from the sensor signal during its sampling of the calibration chamber and the test chambers. This automatically compensates for any contamination of the carrier gas. The calibration step is performed at desired intervals to compensate for drift of the detector or sensing device.

The method of the present invention may be set up as a batch testing system or as a continuous, in-line testing system. The method of the present invention may also be utilized to test various parts of each aerosol container separately (i.e. the valve and one or more of the container seams), as will be described hereinafter.

BRIEF DESCRIPTION OF THE DRAWINGS

FIG. 2 is a graphical representation of a timing diagram for the apparatus of FIG. 1.

FIG. 3 is a diagrammatic representation illustrating an alternate method of providing the calibration chamber with a known leak rate.

FIG. 4 is a diagrammatic representation of a test chamber in which the valve of the aerosol container and the side seam thereof may be tested separately.

DESCRIPTION OF THE PREFERRED EMBODIMENTS

Figure 1:
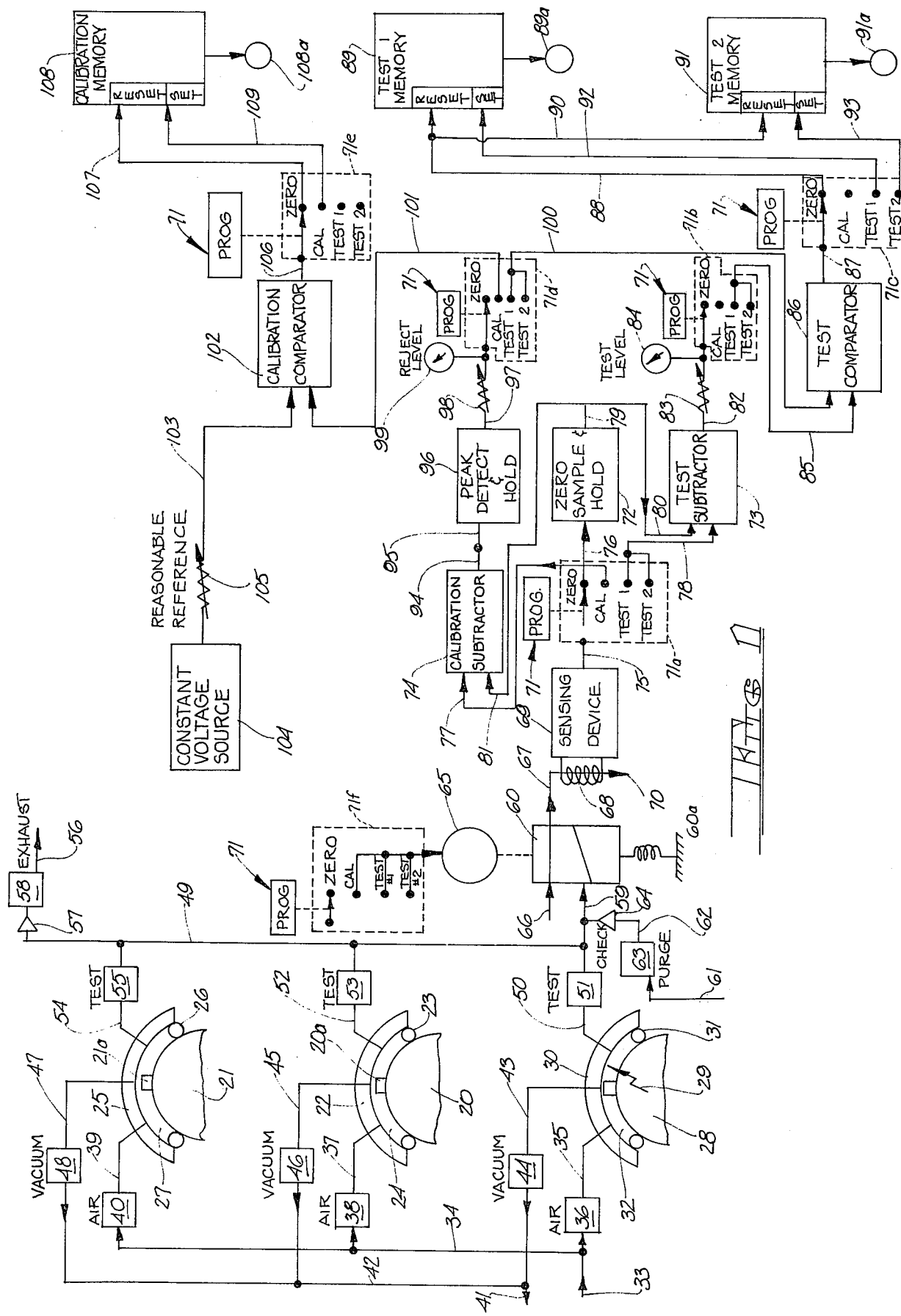
FIG. 1 is a functional diagrammatic representation of the leak detecting means of the present invention.

FIG. 1 is a diagrammatic representation of the apparatus of the present invention with the electronic portions thereof illustrated in the form of a functional block diagram. In FIG. 1, a first aerosol container to be tested is shown at 20, having a conventional valve 20a. A second aerosol container to be tested is shown at 21, having a conventional valve 21a. For purposes of an exemplary showing, the system will be described in terms of the testing of the valves 20a and 21a of the containers for leaks. To this end, aerosol container 20 is provided with a cover member 22 which makes a seal, as at 23, with the upper portion of the container. The seal 23 may be of any appropriate type known in the art. For purposes of this description it is shown as being an O-ring type seal. The cover member 22, the upper portion of the container 20 and the seal 23 define a first test chamber 24. It will be understood by one skilled in the art that the container 20 may be placed in an enclosure which fully surrounds the container, the upper portion of the enclosure being sealed and forming the first test chamber 24.

In similar fashion, the upper portion of container 21 is provided with a cover member 25 and a sealing means 26 so as to define a second test chamber 27.

A third aerosol container is illustrated at 28. The container 28 is provided with a purposeful leak of known leak rate. This is represented by the arrow 29. The upper portion of container 28 is surrounded by a cover member 30 substantially identical to cover members 22 and 25, together with sealing means 31 so as to form a calibration chamber 32.

In the usual arrangement of the apparatus of the present invention a plurality of aerosol containers will be tested and a test chamber will be provided for each. As will be understood hereinafter, each such test chamber will function in an identical manner and in its proper sequence. Therefore, to simplify this description only two such test chambers (24 and 27) are shown.

A source of pressurized carrier gas is indicated by arrow 33. The carrier gas may be purified air or any other appropriate gas, inert from the standpoint of the present process, such as nitrogen or the like. Purified air has been used with success and the carrier gas, for purposes of this description, may be considered to be purified air. A conduit or manifold for the purified air is shown at 34. The manifold 34 is connected to the calibration chamber 32 by conduit 35 containing solenoid valve 36. Similarly, the manifold 34 is connected to the first test chamber 24 by conduit 37 containing solenoid valve 38 and is connected to the second test chamber 27 by conduit 39 containing solenoid valve 40.

A vacuum source is indicated by arrow 41. A vacuum conduit or manifold is shown at 42. The manifold 42 is connected to the calibration chamber 32 by a conduit 43 containing a solenoid valve 44. Similarly, the manifold 42 is connected to the first test chamber 24 by conduit 45 containing solenoid valve 46 and is connected to the second test chamber 27 by conduit 47 containing solenoid valve 48.

Finally, index numeral 49 is applied to a test conduit or manifold, the purpose of which will be apparent hereinafter. Manifold 49 is connected to the calibration chamber 32 by conduit 50 containing solenoid valve 51; to the first test chamber 24 by conduit 52 containing solenoid valve 53; and to the second test chamber 27 by conduit 54 containing solenoid valve 55.

At one end, test manifold 49 is vented to the atmosphere as at 56 through a check valve 57 and a solenoid actuated exhaust valve 58. At the other end, the manifold 49 is connected by conduit 59 to a three-way solenoid valve 60, to be described hereinafter. A source of pressurized carrier gas 61 is connected to the conduit 59 by line 62 containing a solenoid actuated purge valve 63 and a check valve 64. All of the above mentioned solenoid valves 36, 38, 40, 44, 46, 48, 51, 53, 55, 58 and 63 are conventional two-way solenoid valves.

The three-way valve 60 is actuated by solenoid 65. In its normal, de-energized position, solenoid valve 60 is biased by tension spring 60a to connect a pressurized source of purified air or carrier gas 66 to line 67. In its test or energized position, solenoid valve 60 connects conduit 59 to line 67. The line 67 passes through a probe 68 of sensing device 69 and is vented to the atmosphere as at 70. As indicated above, the lower limit of the size of a leak detectable by the method of the present invention depends upon the sensitivity of sensing device 69. Excellent results have been achieved using, for example, an INFICON HALOGEN LEAK DETECTOR, MODEL HLD-1 manufactured by Inficon Inc., East Syracuse, New York.

While all of the operating instrumentalities of the present invention may be caused to perform their functions in proper sequence manually, they are preferably automatically controlled. This control may be accomplished by any appropriate and well known agency such as a motor driven timer or a computer-driven programmer having portions thereof identified by index numeral 71 in FIG. 1, driving switches 71a through 71f. Switch 71f, for example, controls solenoid 65 and valve 60.

The sensing device 69 is followed, in FIG. 1, by three circuits designated "zero sample and hold" 72, "test subtractor" 73 and "calibration subtractor" 74. As is indicated in FIG. 1, the output 75 of the sensing device 69 may, under the control of programmer 71, be connected through switch 71a to an input 76 of the zero sample and hold circuit 72; to an input 77 of the calibration subtractor circuit 74 during testing of container 28; or to an input 78 of the test subtractor circuit 73 during the testing of aerosol containers 20 and 21. The output 79 of the zero sample and hold circuit 72 is connected to an input 80 of the test subtractor circuit 73 and to an input 81 of the calibration subtractor circuit 74.

The output of the test subtractor circuit 73 is indicated at 82. This output contains a variable resistor 83 (the purpose of which will be described hereinafter) and a test level indicator 84. Under the influence of programmer 71, the output 82 of the test subtractor circuit 73 will be connected by switch 71b to an input 85 of a test comparator circuit 86 during the testing of cans 20 and 21. The output of the test comparator circuit 86 is shown at 87. The output 87, under the influence of programmer 71, may be connected through switch 71c to the reset input 88 of test 1 memory circuit 89 and to the reset input 90 of test 2 memory circuit 91. During the testing of aerosol container 20, the output 87 of test comparator circuit 86 will be connected through switch 71c to the set input 92 of test 1 memory circuit 89. Similarly, during the testing of aerosool container 21, the output 87 of the test comparator circuit 86 will be connected through switch 71c to the set input 93 of test 2 memory circuit 91.

The output 94 of the calibration subtractor circuit 74 is connected to the input 95 of a peak detect and hold circuit 96. The peak detect and hold circuit 96 has an output 97 containing a variable resistor 98 (the purpose of which will be described hereinafter) and a reject level indicator 99. The output 97 is controlled through switch 71d by the programmer 71 in such a way that during the testing of containers 20 and 21 output 97 will be connected to an input 100 of the test comparator circuit 86. During the testing of container 28 (having the known leak rate) the output 97 of the peak detect and hold circuit 96 will be connected to an input 101 of a calibration comparator circuit 102. The calibration comparator circuit 102 has a second input 103 from a constant voltage source 104 and a variable resistor 105 (again, the purpose of which will be described hereinafter).

The output 106 of the calibration comparator circuit 102 is, under the influence of programmer 71, connected through switch 71e either to the reset input 107 of calibration memory circuit 108, or to the set input 109 of calibration memory circuit 108.

The test 1 memory circuit 89, test 2 memory circuit 91 and calibration memory circuit 108 may be provided with any suitable readout means, as is well known in the art. For purposes of this description, they are shown provided with indicator lights 89a, 91a and 108a, respectively.

The basic operating instrumentalities of the present invention having been identified, the operation of the system to accomplish the process of the present invention may now be described. Basically, the system contemplates a calibration cycle followed by a test cycle for each aerosol container to be tested. To initiate the process, aerosol container 28 (having the known leak rate) and aerosol containers 20 and 21 to be tested are placed beneath their respective cover members 30, 22 and 25 to form calibration chamber 32, first test chamber 24 and second test chamber 27, respectively. All of the aerosol containers are held firmly against their respective seals to assure that the calibration chamber and test chambers are properly sealed.

At this point, programmer 71 begins a test line purge step by opening test valves 51, 53 and 55, purge valve 63 and all vacuum valves 44, 46 and 48. Pressurized, clean air (carrier gas) from source 61 is forced through purge valve 63 to manifold 49 and test lines 50, 52 and 54. This purging air passes through the test chambers and is drawn off by vacuum source 41 through conduits 43, 45, 47 and vacuum manifold 42. The primary purpose of this step is to purge line 59, test manifold 49 and test lines 50, 52 and 54 of any residual propellant from previous testing cycles.

A time chart for the operation of the system is shown in FIG. 2. The time chart illustrates the actuation of the test valve, air valve and vacuum valve for each of the calibration chambers, first test chamber and second test chamber. The chart also indicates when the three-way valve 60 is actuated by solenoid 65 to connect the test inputs to sensing device 69, the time periods during which the memory circuits 89, 91 and 108 may be set and the times for the opening of the purge valve 63 and the exhaust valve 58. These last three items on the time chart are common to all of the chambers. Reference will be made to the time chart throughout the description of the calibration and test cycles. It will be evident from the chart that the test valve and vacuum valve for each chamber, together with purge valve 63 are opened at the outset of the test line purge step.

Shortly after the test line purge step is initiated, the programmer 71 begins a chamber purge and zero sample step. In this step, the test valve and vacuum valve for each chamber remain open and the air valve for each chamber is opened. This forces clean air (carrier gas) through all of the chambers 24, 27 and 32 from the pressurized air source 33 to purge any residual propellant from the air lines 35, 37 and 39 and chambers 24, 27 and 32. At the same time, calibration memory circuit 108, test 1 memory circuit 89 and test 2 memory circuit 91 are reset to off assuring that their respective indicator lights 108a, 89a and 91a will be off.

During this step the zero sample and hold circuit 72 is set to "zero sample". It will be noted that the three-way solenoid valve 60 is normally set as shown in FIG. 1 so that clean air (carrier gas) from source 66 is continuously caused to pass via line 67 through the probe 68 of sensing device 69. During the chamber purge and zero sample step, the zero sample and hold circuit stores the output of sensing device 69 representing zero sample, i.e. a reading of the clean air (carrier gas) from source 66. It will be evident from the chart of FIG. 2 that the test line purge step (indicated at the bottom of FIG. 2 by arrow A) takes approximately three seconds and the chamber purge and zero sample step (indicated at the bottom of FIG. 2 by arrow B) takes approximately 2 seconds, both ending concurrently.

At this point, the system is ready to prepare for the calibration test, i.e. the test of the known leak rate within calibration chamber 32. To this end, all test valves (51, 53 and 55) and all air valves (36, 38 and 40) are closed. The purge valve 63 is also closed with clean air remaining in the test lines 50, 52 and 54 and test manifold 49. The vacuum valves 44, 46 and 48 remain open. Within calibration chamber 32 a vacuum is pulled for a predetermined period of time to remove from the calibration chamber any residual propellant yet remaining in the chamber or on the container 28. Programmer 71 thereafter closes the vacuum valve 44 to calibration chamber 32, sealing the chamber. As will be evident from the time chart of FIG. 2, the calibration chamber 32 is evacuated for about 24 seconds.

Programmer 71 causes the calibration chamber 32 to remain closed for a fixed period of time to allow the leakage from container 28 to accumulate and diffuse within the chamber 32.

On the time chart of FIG. 2 it will be noted that this accumulation time extends for about 19.5 seconds. During this accumulation period, the vacuum valve 46 in the first test chamber 24 is closed, sealing that chamber to begin the accumulation period therewithin, as will be described hereinafter. Furthermore, near the end of the accumulation period in the calibration chamber 32, purge valve 63 and exhaust valve 58 are opened for three seconds to again assure that test manifold 49 is purged with clean air (carrier gas) from source 61. After the purge and exhaust valves, 63 and 58 respectively, are closed and the accumulation period within the calibration chamber has terminated, the programmer 71 opens air valve 36 to the calibration chamber 32 with the result that clean air (carrier gas) rushes into the evacuated chamber 32 from source 33 causing the leakage propellant or gas which has accumulated therein to co-mingle and equilibrate with the clean air. One and one-half seconds are alloted to achieve the co-mingling and equilibrating whereupon programmer 71 opens test valve 51 and actuates three-way valve 60 so as to connect line 59 with line 67 and to initiate the calibration cycle. Since the air valve 36 is still open, the fixed volume of gas within chamber 32 containing thh co-mingled and equilibrated leakage propellant is forced by displacement through test line 50, test valve 51, line 59, three-way solenoid valve 60 and line 67 through the probe 68 of sensing device 69. The gas sample is thereafter vented to the atmosphere as at 70.

The output signal of sensing device 69 is proportional to the concentration of the propellant in the mixture. Through the agency of programmer 71, this output signal of the sensing device is transferred to the calibration subtractor 74, the output 94 of which is provided with a signal equal to the difference between the signal at input 77 received from sensing device output 75 and the signal at input 81 received from output 79 of the zero sample and hold circuit 72 during the chamber purge and zero sample step. In other words, the signal at output 94 of calibration subtractor circuit 74 represents the output signal of sensor 69 during the calibration test minus the sensing device output for the clean air (carrier gas) alone to compensate for any contamination of the carrier gas. The signal of output 94 of calibration subtractor circuit 74 is transferred to the input 95 of peak detect and hold circuit 96. This circuit stores the highest signal received from the calibration subtractor circuit 74 during the calibration cycle.

During the calibration cycle, the output 97 of peak detect and hold circuit 96 is, through the agency of programmer 71, transferred to input 101 of calibration comparator circuit 102. The calibration comparator circuit 102 receives a second signal via input 103 from the constant voltage source 104. This second input is adjusted by variable resistor 105 so as to constitute a reasonable reference signal or input. This reasonable reference signal establishes a minimum signal level of the system below which the system operation could not be considered reliable. The reasonable reference signal also assures a signal level greater than the noise level. The resulting signal at ouput 106 of the calibration comparator circuit 102 is, by means of programmer 71, transferred to the set input 109 of calibration memory circuit 108. It will be noted from FIG. 2, under the designation "Signal to Memory", that programmer 71 enables a signal to the calibration memory circuit 108 shortly after the opening of test valve 51 and three-way valve 60 to introduce the co-mingled and equilibrated sample in calibration chamber 32 into the sensor probe 68. In the particular embodiment shown, this time delay is indicated as 1 second. This time delay assures that the carrier gas present in test line 50 and conduit 59, prior to opening of test valve 51, has passed through probe 68 and that the set signal from calibration comparator circuit 102 is based upon the peak detected signal from sensing device 69 derived from the co-mingled and equilibrated sample from calibration chamber 32.

If the output signal of the peak detect and hold circuit 96 is lower than the reasonable reference input to calibration comparator 102, the calibration memory circuit 108 will not be set and indicator light 108a will not go on. This means that a reasonable leak rate is not present in calibration chamber 32 and after appropriate adjustment of the leak rate the calibration step must be repeated. If the output 97 of the peak detect and hold circuit 96 is equal to or greater than the reasonable reference input to the calibration comparator circuit 102, the calibration memory circuit 108 will be set, its indicator light 108a will go on and the testing of containers 20 and 21 may proceed.

At this point, programmer 71 terminates the calibration cycle by closing air valve 36 and test valve 51 and causing three-way valve 60 to move to its normal position (shown in FIG. 1) wherein clean air (carrier gas) from source 66 is again put through the probe 68 of sensing device 69.

It will be understood that by subtracting the zero sample or clean air signal of the zero sample and hold circuit 72 from the output signal 75 of the sensing device, any propellant or freon in the "clean air" or carrier gas will not affect the final results. Variable resistor 98 in the output 97 of the peak detect and hold circuit 96 enables a fine adjustment of the "known leak value". It will be noted from the time chart of FIG. 2 that the calibration cycle is completed after about 51 seconds in the particular embodiment described.

Following the termination of the calibration cycle, the programmer 71 causes purge valve 63 and exhaust valve 58 to open to purge manifold 49 of any propellant remaining from the calibration cycle. This purge step lasts about three seconds. It will be remembered that test chamber 24 has already been purged, evacuated and has begun its accumulation step during which any leak from aerosol container 20 will accumulate within the first test chamber 24. After an accumulation period of about 19.5 seconds, the programmer 71 opens air solenoid valve 38 to permit pressurized clean air (carrier gas) to rush in from source 33 and co-mingle and equilibrate with any leakage gas within the first test chamber 24. This co-mingling and equilibration period lasts for about 1.5 seconds whereupon the programmer 71 starts the test cycle for the first test chamber 24 (i.e. for aerosol container 20) by opening test solenoid valve 53 and actuating three-way solenoid valve 60 to its test position connecting lines 59 and 67. Since air valve 38 is already open, the fixed volume of carrier gas and propellant (should a leak be present) is caused to pass through the probe 68 of sensing device 69 by displacement, as in the case of the calibration test cycle.

Through the agency of programmer 71, the signal from the sensing device 69 will be transferred to input 78 of the test subtractor circuit 73 wherein the zero sample or clean air signal from the zero sample and hold circuit 72 is subtracted from the signal from the sensing device 69. As a consequence, the output signal at 82 of the test subtractor circuit 73 represents the leak value signal for aerosol container 20.

Programmer 71 causes the output signal of test subtractor 73 to pass to the input 67 of test comparator 86. The test comparator 86 also receives a signal from the peak detect and hold circuit 96 via input 100. The test comparator output 87 will set the test 1 memory circuit 89 should the output from test subtractor circuit 73 exceed the output of peak detect and hold circuit 96. Should this occur, it means that aerosol container 20 has a leak of an unacceptably high value and the light 89a of test 1 memory circuit 89 will go on. If the test subtractor circuit output is less than the peak detect and hold output, test 1 memory circuit 89 will not be set by the output of test comparator 86 and light 89a will not go on, indicating that aerosol container 20 has no leak or has a sufficiently slow leak rate to be within acceptable limits.

Again it will be noted from FIG. 2 that there is a brief time delay between the opening of test valve 53 and three-way valve 60 and the time at which programmer 71 enables a set signal from test comparator 86. Such a time delay will occur during each test cycle and is for the same reason described with respect to the calibration cycle. That is, this time delay assures that the carrier gas present in test line 52, manifold 49 and conduit 59, prior to the opening of test valve 53, has passed through probe 68 and that the set signal from test comparator 86 is based upon the co-mingled and equilibrated sample from the first test chamber 24.

At this point, programmer 71 terminates the first test chamber cycle by closing air valve 38, test valve 53 and returning three-way valve 60 to its normal position passing clean air (carrier gas) through the probe 68 of sensing device 69. It will be noted from the time chart of FIG. 2 that the test cycle for test chamber 24 is completed after the passage of 63 seconds from the start-up of the test system; just 12 seconds after the system calibration as hereinbefore described. The variable resistor 83 in the output 82 of test subtractor circuit 73 permits an output adjustment for the size of the aerosol container being tested.

Following the termination of the first test chamber cycle, programmer 71 again causes purge valve 63 and exhaust valve 58 to open, purging manifold 49. This purge step again lasts for about three seconds whereupon purge valve 63 and exhaust valve 58 are closed.

During the accumulation step in the first test chamber cycle, the vacuum valve 48 of the second test chamber 27 was closed and the accumulation period for the second test chamber 27 was initiated. Clean air (carrier gas) valve 40 is thereafter caused to open by the programmer 71, resulting in an in-rush of clean air from source 33 into the second test chamber 27. Again, a period of 1.5 seconds is permitted for the co-mingling and equilibration of any leakage gas within the second test chamber 27 and the clean air entering therein. Thereafter, test valve 55 is opened and three-way valve 60 is actuated to its test position, causing the fixed volume of clean air and leakage gas (if any) to pass through the probe 68 of sensing device 69.

As in the case of the first test chamber cycle, the output of the sensing device 69 is conveyed to test subtractor circuit 73 and the value of the clean air or carrier gas from the zero sample and hold circuit 72 is subtracted therefrom to produce an output of test subtractor circuit 73 constituting a leak signal for aerosol container 21. This leak signal, together with the signal from the peak detect and hold circuit 96 is introduced into the test comparator 86. By virtue of programmer 71, the output of test comparator 86 is conducted to test 2 memory circuit 91. If this last mentioned signal sets the test 2 memory circuit 91 and light 91a goes on, this means that the subtractor signal exceeded the value of the peak detect and hold signal indicating an unacceptable leak rate in aerosol container 21. If test 2 memory circuit 91 is not set and light 91a does not go on, the test subtractor signal (i.e. the leak rate signal for aerosol container 21) did not exceed the signal from the peak detect and hold circuit 96 indicating that any leakage rate aerosol container 21 may have is within acceptable limits. Thereafter, programmer 71 will terminate the second test chamber cycle by causing air valve 40 and test valve 55 to close and three-way valve 60 to return to its normal position.

It will be noted from the time chart of FIG. 2 that the first test chamber cycle was completed twelve seconds after completion of the calibration test cycle. Similarly the second test chamber cycle was completed twelve seconds after the first test chamber cycle. If additional test chambers are provided, they will each be tied into the air manifold 34 by an appropriate conduit containing an air valve. They will similarly be connected to vacuum manifold 42 by a conduit containing an appropriate vacuum valve and they will further be connected to the test manifold 49 through an appropriate conduit and test valve. The procedure outlined above for the first test chamber 24 and second test chamber 27 will repeat for each test chamber, such additional tests have completed in twelve second increments.

The three sources 33, 61 and 66 of clean air or carrier gas may constitute separate sources, or they may all comprise a single source.

In the embodiment illustrated in FIG. 1 and described above, the samples from calibration chamber 32 and test chambers 24 and 27 have been described as being transferred to the probe 68 of sensing device 69 by displacement. It will be understood by one skilled in the art that this transfer of samples could be accomplished by providing an appropriate vacuum at 70 (i.e. downstream of the probe 68) and venting calibration chamber 32 and test chambers 24 and 27 to clean air or carrier gas. If an appropriate vacuum were applied at 70, it would be possible to substitute a source of non-pressurized clean air or carrier gas for the pressurized sources 33 and 66.

The practice of the invention thus far described may be further modified to suit the particular application made of it. For example, during each of the calibration test cycle and the first and second test chamber cycles, it would be possible to evacuate the chambers 32, 24 and 27 only for purposes of removing residual gas or liquid propellant. Thereafter, clean air or carrier gas at atmospheric pressure could be introduced into the chambers so that any leaks in the containers being tested would accumulate at atmospheric pressure. In fact, any appropriate pressure may be used within the chambers 32, 24 and 27 during their respective accumulation periods, so long as there is a pressure differential between these chambers and the interiors of the containers therein to enable any leak present to manifest itself.

By testing containers 20 and 21 under vacuum conditions, it will be understood by one skilled in the art that any leaks present in these containers will be accelerated. However, by way of compensation, it will be understood that the standard leak rate within calibration chamber 32 will similarly be accelerated by virtue of the vacuum in that chamber.

In the embodiment thus far described, calibration memory circuit 108 and test memory circuits 89 and 91 are described as actuating signal lights 108a, 89a and 91a, respectively. It will be understood that memory circuits 108, 89 and 91, and particularly the test memory circuits 89 and 91 could be used to trigger other means, such as the logic input of a computer to keep track of a bad container or means to mark or physically reject a bad container.

FIG. 3 shows an alternate method providing the calibration chamber with a leak of known rate. In FIG. 3 a calibration chamber 110 is shown, equivalent to calibration chamber 32 of FIG. 1 and comprising a dummy container 111, a cover member 112 and sealing means 113. The cover member 112 is provided with air conduit 114, vacuum conduit 115 and test conduit 116 equivalent to air conduit 35, vacuum conduit 43 and test conduit 50 of FIG. 1. It will be understood that calibration chamber 110 could be defined by an appropriate sealable enclosure, eliminating dummy container 111.

Instead of providing container 111 with a leak of known rate, the leak of known rate is derived from an adjustable, pressure regulated source of propellant 117. Leakage gas from this source is conducted via conduit 118 to a calibrated leak rate orifice 119. This orifice may be in the form of a capillary orifice. Excellent results have been obtained, for example, utilizing a Calibrated Leak No. 50-420703AAASI manufactured by General Electric, Instrument Department, West Lynn, Massachusetts.

The line 118 contains an on-off valve 120, a gas pressure regulator valve 121 by which the pressure of gas from source 117 may be controlled in line 118 and a pressure gauge 122, if desired. The gas pressure regulator valve 121 may be connected by a conduit 123 to a bleed valve 124.

Standard capillaries of the type described are strongly temperature dependent for accuracy. To this end, a heater 125 is provided to control the temperature of capillary 119. A thermocouple 126 is so positioned as to monitor the temperature of the capillary 119 and to control heater 125 accordingly, via temperature controlling means 127 of any well known type. Finally, temperature read-out means for the thermocouple 126 may be provided, as at 128. The advantage of the structure of FIG. 3 lies in the fact that it permits the provision of a very accurate predetermined leak rate and a leak rate which may be varied in accordance with the type of container being tested or the part of a given container being tested.

As indicated hereinbefore, each aerosol container to be tested may be separately tested for leaks at its valve and for leaks in its top, bottom and side seams. FIG. 4 is a diagrammatic representation of a testing chamber for this purpose which may be substituted for all of the test chambers and calibration chamber of FIG. 1. In FIG. 4, an aerosol container is shown at 129 provided with a valve 130. The aerosol container is fully enclosed in a chamber generally indicated at 131 and having a body portion 131a and a cover member 131b. Means, not shown, are provided for sealing the cover member 131b to the body portion 131a of the chamber. Means 132, in the form of an O-ring, is also shown for sealing and separating that portion of chamber 131 surrounding the body of the container 129 from that portion of the chamber 131 surrounding the valve area of the container 129. Any appropriate sealing means may be used for this purpose.

The container 129 itself, sealing means 132 and the cover member 131b define a first or upper test chamber 133 for the valve portion of the container 129. The body portion 131a of the chamber, together with the body portion of container 129 and sealing means 132 form a second or lower test chamber 134 for the seams of the container.

In FIG. 4 an air or carrier gas manifold is shown at 135 and is equivalent to the air manifold 34 of FIG. 1. Similarly, a vacuum manifold is shown at 136 and a test manifold is shown at 137, being identical to the vacuum manifold 42 and test manifold 49 of FIG. 1. The upper test chamber 133 is substantially identical to either of the test chambers 24 and 27 of the calibration chamber 32 of FIG. 1. Accordingly, test chamber 133 is connected to the air manifold 135 by conduit 138 containing solenoid valve 139. Solenoid valve 139 is equivalent to any of the air valves 36, 38 and 40 of FIG. 1. Upper test chamber 133 is connected to the vacuum manifold 136 by a conduit 140 containing a solenoid valve 141. Solenoid valve 141 is equivalent to any of the vacuum valves 44, 46 and 48 of FIG. 1. Finally, upper chamber 133 is connected to the test manifold 137 by conduit 142 containing solenoid valve 143 equivalent to any of the test valves 51, 53 and 55 of FIG. 1.

The lower test chamber 134 is similarly connected to air manifold 135, vacuum manifold 136 and test manifold 137. Connection is made to the air manifold 135 by conduit 144 containing soleniod valve 145. Connection to the vacuum manifold 136 is accomplished through conduit 146 containing solenoid valve 147. Finally, the lower test chamber is connected to the test manifold 137 by conduit 148 containing soslenoid valve 149.

It will be noted from the description above that the cover portion 131b of chamber 131 is connected to the air, vacuum and test manifolds in the same manner described with respect to FIG. 1. The test of the valve portion 130 of aerosol container 129 (located in upper test chamber 133) is conducted in precisely the same manner described with respect to FIG. 1. It will further be noted that the lower test chamber 134 is connected to the air, vacuum and test manifolds in the same manner as is upper test chamber 133 and as are the chambers in FIG. 1. Therefore, it will be understood that the seams of can 129 can be tested in precisely the same manner as described in conjunction with the can valves in FIG. 1.

When two parts of each aerosol container are to be tested in a simple system of the type shown in FIG. 1, the calibration chamber and all of the test chambers may be of the type illustrated in FIG. 4. Since the acceptable leak rate for the valve portions of the containers to be tested may differ from the acceptable leak rate for the seams, it is preferable in a system of the type illustrated in FIG. 1 that a calibration cycle be run for an acceptable valve leak rate, followed by a test cycle for the valve portion of each aerosol container. Thereafter, a calibration cycle is run for an acceptable seam leak rate, followed by the testing of the seams of each aerosol container. While it does not make any difference whether the valve tests or the seam tests are run first, the important point is that the testing of the valve portions the the seams of the containers should not be intermixed unless the acceptable leak rate for both the valve portions and the seams yield the same leakage concentration or unless the system of FIG. 1 is provided with separate logic systems for the testing of the valve portions and the seams and the programmer is appropriately set up to properly select between the two systems.

When different portions of each container are to be tested, the known leak rate can be achieved in the upper and lower calibration chambers 133 and 134 through the use of containers having purposeful known leak rates. On the other hand, both the upper and lower calibration chambers may be provided with known leak rate systems of the type set forth and described with respect to FIG. 3. Finally, in a system wherein more than one portion of each container is tested, there should be a test memory and indicator light or other read-out means for each test.

As indicated above, the method of the present invention is equally applicable to both batch and in-line testing systems. To this end, FIG. 1 may be considered to represent either type of system. In either type of system the sequence of operations for each test chamber will remain the same. In an in-line system, the timing of the various operations for a given test chamber may be altered to reflect greater speeds necessitated by rapid line filling operations, and the timing of events between containers or from container-to-container may vary to allow sequential operation. Preevacuation of a large number of containers in a storage or accumulation chamber could advantageously be employed in an in-line system. In most applications of an in-line system, it would probably be sufficient to test each can in its entirety although a separate portion or separate portions of each container could be tested as outlined above.

Modifications may be made in the invention without departing from the spirit of it.

The embodiments of the invention in which an exclusive property or privilege is claimed are defined as follows:

1. A method of detecting small gas leaks in a filled, pressurized container comprising the steps of placing said container in a closable test chamber, closing said test chamber, evacuating said test chamber, sealing said test chamber while under vacuum for a predetermined time to permit any leakage gas from said container to accumulate and diffuse within said chamber, introducing a carrier gas into said evacuated chamber, holding said carrier gas within said chamber for a predetermined time to permit said leakage gas and said carrier gas to co-mingle and equilibrate, and thereafter transferring said co-mingled and equilibrated gases to a detector for said leakage gas.

2. A method of detecting small gas leaks in filled, pressurized containers comprising the steps of providing a leakage gas detector and a predetermined leak standard of acceptable value, producing a leak standard signal by said leakage gas detector in response to said predetermined leak standard, providing a test chamber for each container to be tested, placing each container to be tested within its respective test chamber, closing each test chamber from the ambient atmosphere, evacuating each test chamber, thereafter in sequence sealing each test chamber while under vacuum for a predetermined period of time to permit any leakage gas from said container therein to accumulate and diffuse within said test chamber, introducing a carrier gas into each test chamber, and holding said carrier gas therein for a predetermined time to permit said leakage gas and said carrier gas to co-mingle and equilibrate, thereafter in sequence transferring said co-mingled and equilibrated gases from each test chamber to said leakage gas detector, and comparing the container test signal produced by said detector for each container tested to said leak standard signal produced by said detector in response to said predetermined leak standard of acceptable value.

3. The method claimed in claim 2 including the steps of providing a calibration container equivalent to said containers to be tested and having a known leak rate comprising said standard of acceptable value, placing said calibration container in a closed calibration chamber equivalent to said test chambers, evacuating said calibration chamber, sealing said calibration chamber while under vacuum for a predetermined period of time to permit leakage gas from said calibration container to accumulate and diffuse within said calibration chamber, introducing a carrier gas into said evacuated calibration chamber and holding said carrier gas therein for a predetermined time to permit said leakage gas and said carrier gas to co-mingle and equilibrate, thereafter transferring said co-mingled and equilibrated gases to said detector prior to the testing of said filled, pressurized containers to establish said detector leak standard signal.

4. The method claimed in claim 2 including the steps of providing a calibration chamber, closing said calibration chamber from the ambient atmosphere, introducing into said calibration chamber from an external source leakage gas to be detected at a known leak rate comprising said standard of acceptable value, evacuating said calibration chamber, sealing said calibration chamber while under vacuum for a predetermined period of time to permit leakage gas from said external source to accumulate and diffuse within said calibration chamber, introducing a carrier gas into said evacuated calibration chamber and holding said carrier gas therein for a predetermined time to permit said leakage gas and said carrier gas to co-mingle and equilibrate, thereafter transferring said co-mingled and equilibrated gases to said detector prior to the testing of said filled, pressurized containers to establish said detector leak standard signal.

5. The method claimed in claim 2 including the steps of providing a calibration chamber equivalent to said test chambers, closing said calibration chamber from the ambient atmosphere with a dummy container therein equivalent to said containers to be tested, introducing into said calibration chamber from an external source leakage gas to be detected at a known leak rate comprising said standard of acceptable value, evacuating said calibration chambere, sealing said calibration chamber while under vacuum for a predetermined period of time to permit leakage gas from said external source to accumulate and diffuse within said calibration chamber, introducing a carrier gas into said evacuated calibration chamber and holding said carrier gas therein for a predetermined time to permit said leakage gas and said carrier gas to co-mingle and equilibrate, thereafter transferring said co-mingled and equilibrated gases to said detector prior to the testing of said filled, pressurized containers to establish said detector leak standard signal.

6. The method claimed in claim 3 being of the batch type.

7. The method claimed in claim 3 being of the in-line type and constituting a part of the filling procedure for said containers.

8. The method claimed in claim 3 including the step of introducing additional carrier gas into said test chambers and said calibration chamber to transfer said co-mingled and equilibrated gases therefrom to said detector by displacement.

9. The method claimed in claim 3 including the step of applying vacuum downstream of said detector to transfer said co-mingled and equilibrated gases from said test chambers and said calibration chamber to said detector.

10. The method claimed in claim 3 including the steps of comparing said detector leak standard signal to a predetermined reasonable reference signal, activating a calibration memory circuit when said detector leak standard signal is equal to or greater than said reference signal, thereafter in sequence comparing each of said container test signals produced by said detector for each container tested to said detector leak standard signal and activating a test memory circuit for each container tested which has a test signal greater than said detector leak standard signal.

11. The method claimed in claim 3 including the steps of transferring said carrier gas from a source thereof to said detector and obtaining a carrier gas signal from said detector in response thereto, subtracting said carrier gas detector signal from said leak standard detector signal to provide a corrected leak standard signal, comparing said corrected leak standard signal to a predetermined reasonable reference signal, activating a calibration memory circuit when said corrected leak standard signal is equal to or greater than said reasonable reference signal, thereafter in sequence for each container tested subtracting the said carrier gas detector signal from said container test signal to obtain a corrected container test signal, comparing said corrected container test signal to said corrected leak standard signal and activating a test memory circuit for each container tested which has a corrected container signal greater than said corrected leak standard signal.

12. The method claimed in claim 4 being of the batch type.

13. The method claimed in claim 4 being of the in-line type and constituting a part of the filling procedure for said containers.

14. The method claimed in claim 4 including the step of introducing additional carrier gas into said test chambers and said calibration chamber to transfer said co-mingled and equilibrated gases therefrom to said detector by displacement.

15. The method of claim 4 including the step of applying vacuum downstream of said detector to transfer said co-mingled and equilibrated gases from said test chambers and said calibration chamber to said detector.

16. The method claimed in claim 4 including the steps of comparing said detector leak standard signal to a predetermined reasonable reference signal, activating a calibration memory circuit when said detector leak standard signal is equal to or greater than said reference signal, thereafter in sequence comparing each of said container test signals produced by said detector for each container tested to said detector leak standard signal and activating a test memory circuit for each container tested which has a test signal greater than said detector leak standard signal.

17. The method claimed in claim 4 including the steps of transferring said carrier gas from a source thereof to said detector and obtaining a carrier gas signal from said detector in response thereto, subtracting said carrier gas detector signal from said leak standard detector signal to provide a corrected leak standard signal, comparing said corrected leak standard signal to a predetermined reasonable reference signal, activating a calibration memory circuit when said corrected leak standard signal is equal to or greater than said reasonable reference signal, thereafter in sequence for each container tested subtracting the said carrier gas detector signal from said container test signal to obtain a corrected container test signal, comparing said corrected container test signal to said corrected leak standard signal and activating a test memory circuit for each container tested which has a corrected container signal greater than said corrected leak standard signal.

18. The method claimed in claim 10 wherein said calibration and test memory circuits, when actuated, activate read-out means.

19. The method claimed in claim 10 wherein said test memory circuits, when actuated, activate means for rejecting those containers the detector container test signals of which is greater than said detector leak standard signal.

20. The method claimed in claim 11 wherein said calibration and test memory circuits, when actuated, activate read-out means.

21. The method claimed in claim 11 wherein said test memory circuits, when actuated, activate means for rejecting those containers the detector container test signals of which is greater than said detector leak standard signal.

22. A method of detecting small gas leaks in a filled, pressurized container comprising the steps of placing said container in a closable test chamber, closing said test chamber, evacuating said test chamber to remove residual leakage gas therefrom, introducing into said chamber a carrier gas at a pressure less than the pressure within said container, holding said carrier gas within said test chamber for a predetermined period of time to permit any leakage gas from said container to accumulate and diffuse within said test chamber and to permit said leakage gas and said carrier gas to co-mingle and equilibrate, and thereafter transferring said co-mingled and equilibrated gases to a detector for said leakage gas.

* * * * *